Oct. 9, 1962   K. R. BRAGG   3,057,373
FLOW LIMITING VALVE
Filed Oct. 19, 1959

INVENTOR.
KENNETH R. BRAGG
BY
John N. Wolfram
ATTORNEY 3,057,373
FLOW LIMITING VALVE
Kenneth R. Bragg, Manhattan Beach, Calif., assignor to Parker-Hannifin Corporation, Cleveland, Ohio, a corporation of Ohio
Filed Oct. 19, 1959, Ser. No. 847,414
5 Claims. (Cl. 137—521)

This invention relates to a valve for cutting off flow of fluid therethrough when the flow reaches a predetermined rate and it is particularly adapted for systems in which the flow rates are relatively low.

Devices of this type are used for shutting off or materially restricting flow of fluid through a line in the event a downstream leak occurs which would otherwise cause undesirable loss of the fluid from the system. The device has application, for example, in an oxygen supply system for aircraft pilots wherein there is a controlled flow of oxygen from a supply tank through a manifold having several branch lines for supplying several pilots, and wherein it is desirable to shut off any branch line which develops a significant leak so that the entire supply will not be lost by reason of the leak.

It is an object to provide a flow limiting valve of the type described in which flow is shut off by a valve member which flexes from its open position to its shut position to thereby avoid sliding or rotating valve members which are apt to stick in one position or another.

It is another object to provide such a device which utilizes a leaf spring as a movable valve member and in which the spring is free of vibration while in the open position and which moves with a snap action to closed position when the predetermined flow rate for operating the valve is reached.

It is another object to provide a flow limiting valve which is capable of repeatedly shutting off in response to flow rates which are exceedingly close to the predetermined or calibrated rate.

It is another object to provide a valve of the type described in which the movable valve element is protected against dynamic fatigue failure.

Another object is to provide a valve of the type described in which the valve member is maintained relatively far from its seat when in the open position and which closes very rapidly when closing movement is initiated, thereby making the valve relatively insensitive to clogging by dirt.

Figure 1:
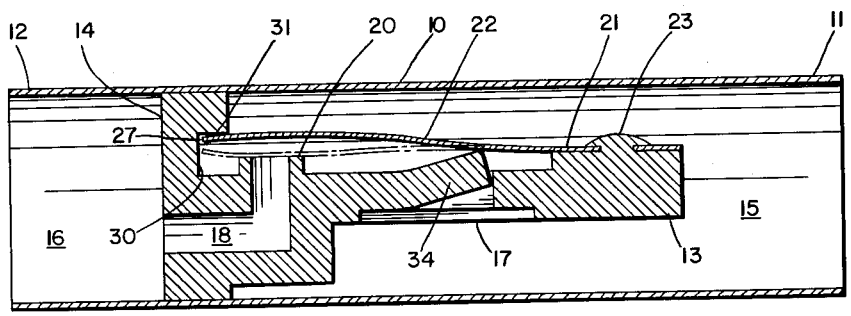
Figure 2:
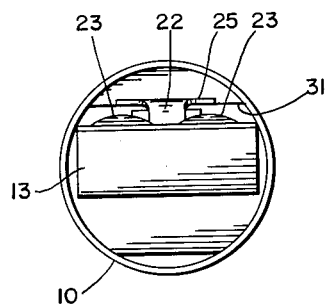
Figure 3:
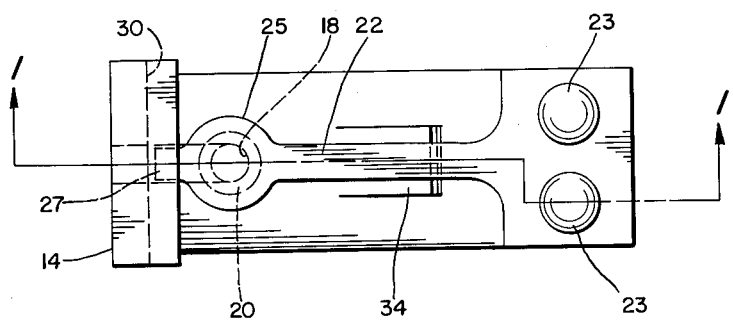

Other objects will be apparent from a detailed description and from the drawings in which:

FIG. 1 is a cross section view of the device,
FIG. 2 is an end view, and
FIG. 3 is a top view of the movable valve member and the seat member for the device.

As illustrated in FIG. 1, the valve includes a suitable housing 10 which may be in the form of a tubular member having end sections 11 and 12 which may be connected to manifolds, tubing lines, or other parts of the system, not shown, by brazing or other well known connecting means. A valve seat member 13 having a cylindrical head 14 is secured within the tube 10. Such securing may be accomplished by a press fit between the cylindrical head 14 and the tube 10, or by other means, such as swaging of the tube 10 upon the head 14, by brazing, or by other equivalent means.

The cylindrical head 14 divides the tubular housing 10 into an inlet section 15 and an outlet section 16. The seat member 13 includes a central portion 17 projecting axially from the head 14 into the housing inlet section 15, and it has a flow passage 18 passing through the head 14 and a portion of the central portion 17 for connecting inlet passage 15 with outlet passage 16. A valve seat 20 surrounds the one end of the passage 18 and faces the housing inlet section 15.

The seat member 13 has a mounting face 21 spaced from the seat 20 and a flexible valve member 22 is rigidly fastened at one of its ends against mounting face 21 by means of rivets 23 which may be separate or an integral part of member 13. The valve member 22 is in the form of a thin leaf spring which is initially flat. The opposite end of the leaf spring 22 is movable and includes a circular portion 25 which overlies annular valve seat 20 and which is adapted to move into and out of seating engagement with valve seat 20 for opening and closing passage 18 to control the flow of fluid through valve housing 10.

Adjacent the circular portion 25 the valve member 22 has a narrow tab 27 which is located within a slot 30 extending transversely across the head 14 and which provides an abutment shoulder 31 at the upper edge of the slot.

Between the annular valve seat 20 and the mounting face 21 the seat member 13 has a tongue 34 formed therein which is bent upward to provide a fixed abutment which engages the valve and normally holds the same with tube 27 in engagement with abutment shoulder 21, the latter serving to limit the extent to which the valve member can move in a direction away from valve seat 20. The tongue, or abutment, 34 bears against the valve member 22 intermediate its ends so that when the valve member is in open position it is slightly bowed upwardly to develop spring tension within the valve member 22 for keeping the tab 27 seated against shoulder 31 during such times that the flow rate through the valve is less than a predetermined amount whereby tab 27 will not vibrate into and out of engagement with abutment shoulder 31. By avoiding such vibration, the valve member is not subjected to fatigue stresses which would otherwise shorten its life. Also, fluctuating flow past the circular valve face 25 into passage 18 is avoided.

In operation, the valve member 22 is normally maintained in open position away from valve seat 20, as shown in FIG. 1, by the fixed abutment 34 and fluid may flow from housing inlet section 15 past valve member 22 into passage 18 and then into housing outlet section 16. In the normal operation of the system into which the flow limiting device 10 is installed, the flow rate through the valve 10 does not exceed a predetermined maximum. In the event a significant leak develops downstream of valve 10, the flow rate through valve 10 will rise and when it reaches a predetermined value the flowing fluid will cause valve member 22 to close against seat 20 to shut off further flow. Such closure is effected by reason of the pressure drop of the fluid acting on the valve member as the fluid flows across valve member 22 from the inlet section 15 to passage 18.

Such pressure drop across valve member 22 increases as the flow rate increases and also as the gap between the valve member seating portion 25 and valve seat 20 decreases. However, the parts are so designed that the rate at which such pressure drop increases as the valve member seating portion 25 moves toward the valve seat 20 is greater than the spring rate of valve member 22. Hence, when the valve member starts to move to closed position due to reaching of the predetermined flow rate through the valve, it will close very rapidly with a snap action to the position shown in the dotted lines in FIG. 1. This positive and rapid closing action prevent fluttering or vibration of the valve member and contributes to the long service life thereof.

The valve may be calibrated for shutting off at selected predetermined flow rates by varying the amount which the tongue 34 is bent upwardly against valve member 22, it being apparent that the further it is bent upwardly the greater will be the predetermined flow rate at which shut off occurs. Also, the valve is self resetting in that after the downstream leak has been repaired, if pressure in inlet 15 is reduced to the point where the pressure exerted by the fluid in inlet 15 for keeping the valve member closed is less than the spring tension developed by abutment 34 tending to open the valve plus back pressure exerted on the valve member by fluid within outlet section 16, the valve member will snap upwardly to open position. Since the spring tension acting to open the valve member is constant for a given adjustment or positioning of abutment 34, the opening action occurs at a predetermined differential in the fluid pressures within inlet section 15 and outlet section 18.

An important feature of the invention is that in the open position the valve member 22 is spaced relatively a large distance from seat 20 to provide a substantial flow passage therebetween which permits dirt particles in the fluid to pass readily therethrough and thus avoid clogging. The snap action closing further protects against clogging by closing the gap rapidly once closing action is initiated.

Although one form of the invention has been shown and described, it is apparent that various modifications can be made without departing from the scope of the invention as defined by the claims.

I claim:

1. A fluid flow limiting valve comprising a housing having a passage therethrough including a cylindrical opening, a valve seat member fixed within said housing and including a cylindrical head in sealed engagement with the wall of said opening and dividing said housing passage into inlet and outlet sections, said seat member having a central portion extending axially from said head into said inlet section and spaced radially from the wall of said cylindrical opening, said central portion having a mounting surface spaced from said head, said head having an abutment shoulder, a passage through said central portion and said head connecting said inlet and outlet sections, a valve seat surrounding said passage through said central portion between said abutment shoulder and said mounting face and facing said inlet section, a valve member in the form of a leaf spring fixed at one of its ends to said mounting face and having its other end movable between said abutment shoulder and said valve seat, an abutment on said central portion engaging said valve member intermediate its ends for normally maintaining said movable end against said abutment shoulder and away from said seat, said movable end being movable against said seat by the influence of pressure drop of fluid flowing thereacross when fluid flows through said flow passage at a predetermined rate.

2. A valve in accordance with claim 1 in which said abutment comprises a tongue formed by slitting said central portion and bending said tongue toward said valve member.

3. A valve in accordance with claim 1 in which said abutment comprises a tongue having one end rigidly attached to said central portion and its other end bent toward said valve member.

4. A fluid flow limiting valve comprising a valve housing having a flow passage therethrough, a valve seat surrounding a portion of said flow passage, a flexible valve member in said housing having a part rigidly attached to said housing and having a movable part with a seating portion overlying said seat and adapted to be flexed into and out of engagement with said seat for controlling flow of fluid through said passage, a fixed abutment means spaced from said rigidly attached part and engageable with said movable part intermediate said rigidly attached part and said seating portion for normally maintaining said valve member in open position, said seating portion being flexed against said seat by the influence of pressure drop of fluid flowing across said valve member when fluid flow through said passage reaches a predetermined rate, an abutment shoulder in said housing for limiting movement of said movable part in a direction away from said seat, said fixed abutment means being operable on said valve member for normally holding said movable part in engagement with said abutment shoulder with said movable part bowed away from said seat until said predetermined flow rate has been reached whereby said valve member reverses its bow and closes with a snap action.

5. A fluid flow limiting valve comprising a housing having a flow passage therethrough, a valve seat surrounding a portion of said flow passage, a valve member in said housing having a part rigidly mounted therein and having a movable part with a seating portion overlying said seat and movable into and out of engagement with said seat for controlling flow of fluid through said passage, an abutment in said housing engageable with said movable part for limiting movement of said movable part in a direction away from said seat, non-yielding means in said housing in constant engagement with said movable part intermediate said rigidly mounted part and said abutment biasing said movable part into engagement with said abutment with a predetermined force with said seating portion spaced from said seat when fluid flow through said passage is less than a predetermined rate whereby said valve member is maintained in a fixed, flutter-free position when in open position against said abutment, said seating portion being movable with a snap action against said seat by the influence of pressure drop of fluid flowing across said valve member when fluid flow through said passage exceeds said predetermined rate.

References Cited in the file of this patent

UNITED STATES PATENTS

| | | |
|---|---|---|
| 572,464 | Woods | Dec. 1, 1896 |
| 892,033 | Draper | June 30, 1908 |
| 1,768,110 | Boynton | June 24, 1930 |
| 2,217,380 | Pedder | Oct. 8, 1940 |
| 2,615,675 | Mellert | Oct. 28, 1952 |

FOREIGN PATENTS

| | | |
|---|---|---|
| 6,736 | Great Britain | Mar. 26, 1908 |
| 459,649 | Great Britain | Jan. 12, 1937 |
| 706,982 | France | Apr. 4, 1931 |
| 801,926 | France | May 30, 1936 |